United States Patent [19]
Gorman

[11] 3,802,860
[45] Apr. 9, 1974

[54] METHOD OF LIQUID QUENCHING OF GLASS
[75] Inventor: Harold R. Gorman, Oakmont, Pa.
[73] Assignee: PPG Industries, Inc., Pittsburgh, Pa.
[22] Filed: Aug. 14, 1972
[21] Appl. No.: 280,613

[52] U.S. Cl. .................................. 65/116, 65/114
[51] Int. Cl. ........................................ C03b 27/00
[58] Field of Search .......................... 65/114, 116

[56] References Cited
UNITED STATES PATENTS
3,706,544   12/1972   Michalik .............................. 65/116

Primary Examiner—Arthur D. Kellogg
Attorney, Agent, or Firm—Edward I. Mates

[57] ABSTRACT

An improved method for tempering glass is described which involves contacting a first portion of heated glass with a first liquid medium having a first heat transfer characteristic of sufficiently low magnitude to minimize the danger of chill cracking, then with a second liquid medium having a different heat transfer characteristic while the first liquid medium contacts a second portion of the glass and finally contacting both glass portions with the second liquid medium. The first and second liquid media are arranged in a multiple layer bath with the first liquid medium arranged as the upper layer of the bath and the second liquid medium as the lower layer of the bath when the contact is done by dip quenching. This is made possible because the first liquid medium is less dense than the second liquid medium and the media have different heat transfer coefficients. The multiple layer bath may comprise more than two layers and an intermediate layer thereof can be a mixture or a solution of adjacent layers that are somewhat miscible or the intermediate layer can have a different composition of intermediate density. As another alternative, the first and second liquid media may be the same composition having different levels maintained at different temperatures to provide different heat transfer characteristics at different levels of the bath. Also, different liquids in a multiple layer bath may be maintained at different temperatures or at selected temperature gradients in the direction of depth.

10 Claims, No Drawings

METHOD OF LIQUID QUENCHING OF GLASS

BACKGROUND OF THE INVENTION

The tempering of glass is typically accomplished by heating glass to an elevated temperature (a temperature above the glass strain point) and then suddenly chilling the glass to cool the glass surface rapidly while the interior regions of the glass cool at a slower rate. This differential cooling pattern of the glass being tempered results in the development of a compressive stress in the glass surface and a tensile stress in the interior regions of the glass. The resultant tempered glass has a much greater resistance to fracture than does untempered glass. Further, glass which has been tempered and does fracture has a breakage pattern which is significantly different from that of untempered glass in that it shatters into small fragments with blunt rounded edges rather than large sharp-edged pieces which result when untempered glass fractures. Tempered glass, because of its desirable qualities on breakage, has an obvious advantage over untempered glass rendering it particularly useful in transparent doors, motor vehicle closures, ophthalmic lenses and the like.

Glass has been tempered by applying cool air to the surface of heated glass and has been found satisfactory for this purpose especially on glass of considerable thickness -one-eighth inch or more). Cool air tempering has not been found as acceptable in cooling thinner glass (below one-eight inch in thickness) in that only low degrees of temper have often been obtained.

It has been suggested in the prior art to replace air or gas as a cooling medium and to use instead liquids. Liquids, because of their superior heat transfer characteristics compared to air, should remove heat much more rapidly from glass surfaces than air. More rapid cooling will set up a greater differential cooling pattern between the interior and the surfaces of the glass cooled, thus creating the potential for the attaining of a higher degree of temper in the glass than possible with air tempering.

Using liquids instead of air to thermally temper a glass sheet is generally referred to in the art as liquid quenching. In liquid quenching, rapid cooling of the glass is accomplished by contacting the surface of the glass with a liquid quenchant. Contacting the surface of the glass can be accomplished by various techniques, such as flowing a quenching liquid over the surface of the glass. This is known as "flood quenching" and is described in U.S. Pat. application Ser. No. 108,661, filed Jan. 21, 1971, now U.S. Pat. No. 3,725,024. Another method of contact is "spray quenching", which involves atomizing the quenching liquid into discrete liquid droplets and then spraying the surface of the glass. "Spray quenching" is well known in the metal tempering art and is disclosed, for example, in U.S. Pat. No. 3,208,742. Another method of contact is to immerse the glass sheet completely in the quenching liquid. This technique is referred to in the art as immersion quenching or dip quenching and is described in U.S. Pat. Nos. 170,339; 2,145,119; 2,198,739; 3,186,816; 3,271,207 and Belgian Pat. No. 729,055.

Although liquid quenching has been found to be moderately effective with rather thick glass sheets, it has not been very effective in tempering thinner glass specimens. Often the thinner glass fractures when the sheet is initially contacted with the quenching liquid. The fracture appears to initiate at the edges of the sheet, continues into the body of the glass resulting in total breakage of the sheet.

One of the more important causes of fracturing of thin glass sheets in liquid quenching processes is believed to be due to the fact that the edges of the glass cool at too rapid a rate when compared with the remainder of the glass sheet. In accomplishing a liquid quench by dipping a glass sheet into a liquid quenching bath, this rapid cooling of glass edges is magnified at the "leading edge" of the glass, i.e., the edge or portion of the glass which first contacts the liquid quenching fluid. This differential cooling is referred to as the leading edge effect. Thus, in dip quenching this differential rate of cooling between the leading edge and the remainder of the glass sheet puts the leading edge temporarily in tension in which condition it readily fractures upon the subsequent thermal shock of dip quenching.

The leading edge cools at a greater rate than the remainder of the glass sheet because the leading edge dissipates heat by more mechanisms than does the remainder of the glass sheet. The leading edge dissipates heat not only because of the temperature differential between it and the quenching liquid, but also dissipates heat due to the hydrodynamic phenomena caused by liquid flow over the leading edge. This hydrodynamic flow of the quenching liquid over the leading edge as the glass sheet passes through the quenching liquid on immersion removes tremendous quantities of heat at a rapid rate from the leading edge. Thus, a situation is created where a relatively small area of the glass, that is the leading edge, is cooled at a much faster rate than is the remainder of the glass. This difference in the rate of cooling puts the leading edge in tension in which condition it is particularly susceptible to thermal shock and breakage. This effect is particularly noticeable in glass having a relatively high coefficient of thermal expansion, such as commercial plate, sheet and float glass of soda-lime-silica composition.

In accordance with this invention a technique is provided for thermally tempering glass by liquid quenching, which minimizes the problems of premature edge cooling and resultant glass fracturing. In addition, the present invention provides a novel technique for controlling the stress gradient through the thickness of a glass sheet tempered by dip quenching.

SUMMARY OF THE INVENTION

In accordance with certain specific embodiments of the present invention, glass which is to be tempered is treated by heating it to above the strain point and then immersing it in a multiple layer liquid quenching bath, the upper layer of which is preferably of a liquid medium having a first heat transfer characteristic at the liquid-glass interface of limited magnitude and a density less than that of the lower layer. In this manner a first portion of the glass contacts the first liquid medium first in such a manner that the tendency to chill crack the glass is reduced. While the glass is further immersed into the multiple layer liquids, the first glass portion is lowered into the lower layer while a second glass portion passes through the upper layer and finally both portions are immersed into the lower layer. As an alternative, the entire glass sheet may be passed through the upper layer before its first portion contacts the lower layer.

The liquid quenching bath has a heat transfer coefficient high enough to impart a high degree of temper to the glass, particularly the lower layer of the bath. Exposing each glass portion to two cooling liquids in succession, one having a different heat transfer coefficient than the other, results in less glass breakage than is the case when the glass is immersed directly into a single liquid.

The term "heat transfer characteristic" as used in this specification is a function of both the temperature difference between the tempering liquid medium and the hot glass at the interface between the glass and the medium and the heat transfer coefficient of the medium. The term "heat transfer coefficient" relates to the amount of heat transferred per unit time per unit area per unit temperature difference at an interfacial surface between a hot glass sheet and a tempering liquid medium.

For glass compositions having a relatively high coefficient of thermal expansion, such as commercial float, sheet or plate glass, the upper layer preferably has a lower heat transfer coefficient than the lower layer. However, for glasses having a lower coefficient of thermal expansion, such as borosilica glass compositions, the upper layer may have a higher heat transfer coefficient than the lower layer.

The quenching bath may have more than two layers of different liquids in case different stress profiles are desired throughout the glass thickness. The present invention is not limited to quenching glass in a multiple layer bath having only two layers. In such a case, an intermediate layer may be either a liquid whose composition differs from that of each adjacent layer in case the layers are non-miscible, or a mixture or a solution of adjacent layers if the latter are miscible.

The same effect as produced by a multiple layer bath is also produced in a bath consisting essentially of the same composition of liquid medium throughout, by maintaining different levels of the quenching bath at different temperatures, particularly when the liquid medium is one having a heat transfer coefficient that varies with temperature. A multiple layer bath may also have its heat transfer characteristics modified by controlling the temperature gradient in the direction of the depth of the bath.

Furthermore, one or more of the layers of liquid tempering medium may include or exclude additives that improve the characteristics of the altered tempering medium, such as by raising its flash and/or fire point and/or gel temperature, by stabilizing its viscosity, reducing its tendency to oxidize, changing its degree of polymerization, and/or by decreasing its volatility. The additives are preferably added to the medium before the latter is placed in the quenching tank.

Another factor that reduces glass breakage involves treating the glass edges of the glass to be tempered by liquid cooling with a frit composition having a thermal coefficient of expansion less than the glass on which it is placed, typically one having a thermal coefficient of expansion on the order of $7.6 \times 10^{-6}$ inches per linear inch per degree Centigrade ($\alpha\ 7.6 \times 10^{-6}/°C.$), preferably $6.8 \times 10^{-6}$ inches per linear inch per degree Centigrade or less ($\alpha\ 6.8 \times 10^{-6}/°C.$) measured at 0 to 300° Centigrade, as described and claimed in copending U.S. Pat. application Ser. No. 253,354 for METHOD OF LIQUID QUENCHING, filed May 15, 1972, now U.S. Pat. No. 3,765,859. the disclosure of which is incorporated herein by reference. Other suitable edge-protecting compositions described and claimed therein have heat transfer coefficients not greater than that of glass.

After application of the glass edge protecting composition to the edge of the glass in case such application is needed or desired, the glass is first heated to an elevated temperature, usually somewhere near the softening point of the particular glass being tempered. The softening point, as used herein, is that condition in which glass has a viscosity of 107.6 poises. The temperature at the softening point of the glass will vary depending on the particular composition of the glass. For example, in a soda-lime-silica glass composition, the temperature at the softening point is about 1,400°F. In a borosilica glass composition, this temperature is about 1,500°F.

When the glass has been heated to the abovedescribed elevated temperature, it is immediately contacted with a liquid quenching agent where heat is exchanged between the surface of the glass and the liquid. A direct measure of this heat exchange is the heat transfer coefficient. The heat transfer coefficient is defined as the heat flux at the glass-liquid interface between the heated, immersed glass body and the surrounding liquid per unit of temperature difference-unit of time-unit of glass surface. For the purposes of this invention, the heat transfer coefficient is expressed as British Thermal Units/hour-square foot-degree Fahrenheit (B.T.U./hr.-ft.$^2$-°F.).

In tempering the treated glass articles, the quenching liquid preferably is one which provides a relatively high average heat transfer coefficient over the entire range of temperature employed in the tempering process. With thin glass, heat exchange between the interior of the glass and the surface is appreciably more rapid than with thicker glass. Therefore, in order to achieve as high a degree of temper in thin glass as is obtainable with thicker glass, the heat flux at the glass-liquid interface must be proportionately greater for thin glass than for thicker glass. One way of providing a greater heat flux at the glass-liquid interface is to quench in a liquid providing a relatively high average heat transfer coefficient over the entire temperature range employed in the tempering process.

It has been found in the practice of this invention in tempering glass of the high thermal expansion coefficient type having been treated on the edges with a frit having a low thermal coefficient of expansion by a liquid-quenching technique, that the quenching should be accomplished in bilayer liquids whose upper layer has an average heat transfer coefficient of at least 125 and not more than approximately 350 B.T.U./hr.-ft.$^2$-°F., and the lower layer of which has an average heat transfer coefficient preferably within the range of approximately 200 to 600 B.T.U./hr.-ft.$^2$-°F. as the glass is cooled through the temperature range used in the tempering process. The glass surface at the upper limit of the temperature range of the tempering process has a surface temperature near its softening point, while at the lower limit of said range it has a surface temperature below that of the interior of the glass when said interior has cooled through the glass strain point. The glass strain point as used herein is that condition in which glass has a viscosity of $10^{14.6}$ poises. When glass has been cooled through the strain point, the final degree of temper in the glass has been attained.

In tempering thinner glass, i.e., glass of about 0.050 to 0.090 inch in thickness, to obtain a high degree of temper, quenching liquids should be used which provide an average heat transfer coefficient in the upper ranges of the limits set forth. With thicker glass, i.e., glass of about 0.100 to 0.500 inch in thickness, a high degree of temper can be obtained using liquids which provide average heat transfer coefficients in the lower ranges of the limits set forth.

Besides quenching with liquids which provide an average heat transfer coefficient at the glass-liquid interface within the above-specified limits, it is also important that the quenching liquid provide a relatively low heat transfer coefficient when the glass is at the upper region of the temperature range of the tempering process and a relatively high actual heat transfer coefficient as the glass is cooled through the lower temperature regions of the tempering process. These lower temperature regions have an upper limit of glass surface temperature near its strain point down to a lower limit of a surface temperature existing when the interior regions of the glass pass through the strain point. When the temperature difference between the glass and the tempering liquid is relatively large, such as when the glass enters the upper level, the liquid should have a relatively low actual heat transfer coefficient of sufficient size to cool the glass surfaces, but insufficient to cause breakage. When the glass cools on immersion through the upper level of a bilayer tempering liquid and the temperature difference between the glass and the liquid is reduced somewhat, the liquid in the lower layer should have a relatively high heat transfer coefficient to assure a temper of the desired magnitude in the glass.

In the practice of this invention, it has been found in tempering the edge treated glass that the actual heat transfer coefficient at the glass-liquid interface should not fall off too quickly as the glass is cooled down through the lower temperature regions of the process. Accordingly, the average heat transfer coefficient for the upper layer should be always at least 125, generally 125 to 350, and that of the lower layer preferably 200 to 600 B.T.U./hr.-ft.$^2$-°F. for soda-lime-silica glass as the glass surface is cooled from a temperature near its strain point down to a lower surface temperature at which the center of the glass has cooled to a temperature below the strain point. As an example, with soda-lime-silica glass, the temperature of the glass surface at the strain point is typically about 960°F. The lower temperature, i.e., the surface temperature of the glass at which the center of the glass has cooled to a temperature below the strain point, is more difficult to pin down and will depend upon, among other things, the thickness of the glass, the composition of the glass, and the heat flux at the glass-liquid interface. For soda-lime-silica glass having a thickness of about 0.050 to 0.125 inch with a heat transfer coefficient at the glass-liquid interface which will provide for a high degree of temper in the resultant glass article, the lower temperature of the surface of the glass will be about 500°–600°F.

Liquids which can be utilized as the upper layer for use in the instant process are silicone fluids or hydrocarbon oils having a lower density than the quenching liquid in the lower layer. Generally, the heat transfer coefficient of the upper layer can be reduced by using a liquid having a higher viscosity for one of a lower viscosity. Other suitable materials for the various layers are recited in the table that follows:

The silicone fluids used in the upper layer are dialkyl, diaryl or alkyl-aryl fluids. The fluids are linear polymers of alternating silicon and oxygen atoms, each silicon atom having two organic groups attached to it. The chemical formula for the silicon fluids is:

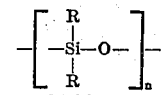

where n varies from 9 to 100, and R is selected from alkyl and/or aryl groups. R can be selected from lower alkyl groups having 1 to 4 carbon atoms. When R is methyl, the above formula depicts the familiar dimethyl silicone fluids. Also R can be selected from aryl groups, especially phenyl groups and alkyl and halo substituted phenyl groups. The incorporation of phenyl groups into the polysiloxane polymer backbone increases the oxidative stability of the fluid. The larger the value of n in the above formula, the higher the molecular weight and the higher the viscosity is in the resulting silicone fluid. In the practice of this invention, silicione fluids having a molecular weight of from about 675 to 11,000 and a viscosity of from about 5 to 1,000 centistokes and preferably 50 to 100 centistokes at 77°F. are included. Methyl phenyl silicone liquids and other high temperature flash point and high temperature gel point silicones are also useful.

Silicone fluids are sold commercially under the trademarks Dow Corning Silicone Fluids and General Electric SF. Silicone fluids are well known in the art and are described in An Introduction to the Chemistry of the Silicones, 2nd Edition, by E. G. Rockow, Wiley, New York 1951.

One method of preparing the silicone fluids useful in the invention is to hydrolyze in an acidic-aqueous medium dialkyl, diaryl and/or alkyl, -aryl dichlorosilanes.

$R_2 = Si = Cl_2 + H_2O \xrightarrow{H+} R_2 - Si - (OH)_2$ wherein R = alkyl and/or aryl. The silane diol is unstable and self-condenses to a polysiloxane, or what is commonly known as the silicone fluid. $R_2 - Si - (OH) \longrightarrow [R_2 = Si = O]n$ wherein R = alkyl and/or aryl and $n = 9$ to about 100.

To prepare low molecular weight or low viscosity products a trialkyl silane such as trimethyl chlorosilane can be added as an end blocker. Thus, for example, if two moles of trimethyl chlorosilane are added for each mole of dimethyldichlorosilane, the following reaction occurs:

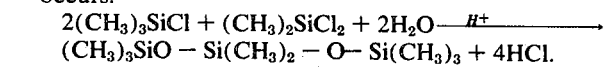

Reduction of the amount of trialkyl silane allows, of course, the formation of higher molecular weight compounds. This end blocking technique is an effective way to control viscosity and also serves to stabilize the viscosity of the silicone fluid against further polymerization upon standing.

Examples of liquid-quenching agents useful for the lower layer in the practice of this invention are the polyoxyalkylene glycols, such as polyoxyethylene glycols, polyoxypropylene glycols or mixtures thereof (polyglycols) and certain hydrocarbon oils heavier than the liquid of the upper layer.

Polyoxyethylene glycols, $HO\text{-}CH_2\text{-}CH_2(OCH_2\text{-}CH_2)_nOH$, $N = 1$ to 1,000 range at room temperature from water-white liquids to waxy solids. Those above 1000 in molecular weight are sold commercially under trademark CARBOWAX. Although pure polyoxyethylene glycols can be prepared and can be used in the practice of this invention, the commercially available compounds are actually reaction products or blended mixtures of a number of polyoxyethylene glycol polymers of various molecular weights. The commercially available polyoxyethylene glycols up to a molecular weight of about 700 are water-white liquids at room temperature. Those having molecular weights of 1000 or above are solids that vary in consistency at room temperature from a petrolatum-like grease to a hard wax. If these higher molecular weight polyoxyethylene glycols are used as the quenching liquids in the practice of this invention, they should first be heated to above their melting point to convert them to a liquid before use. The polyoxyethylene glycols are typically prepared by an alkali catalyzed condensation of ethylene oxide in water:

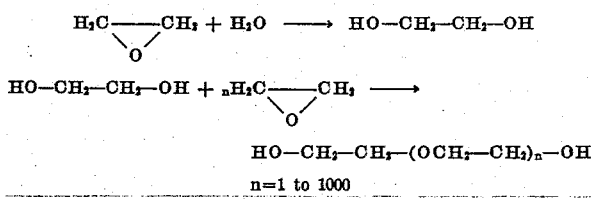

Polyoxypropylene glycols, $HO-(C_3H_6-O)_n-C_3H_6-OH$, $n = 1$ to 1000, are colorless to light yellow viscous liquids. They are commercially available in molecular weights ranging from approximately 400 to 2,000. They are manufactured by the polymerization of propylene oxide in the presence of an acid or alkaline catalyst. The procedure is similar to that used in the preparation of polyoxyethylene glycols. The low molecular weight polyoxypropylene glycols, i.e., up to a molecular weight of 500, are completely water soluble, while those of higher molecular weight, i.e., from 1,000 to 2,000, are only slightly soluble in water. Those having an intermediate molecular weight, i.e., from 600 to 900, are moderately soluble in water, about 10 to 20 percent at room temperature. For the practice of this invention, the partially and completely water soluble polyoxypropylene glycols are preferred. Polyoxypropylene glycols are commercially available under the trademark NIAX.

Mixed polyoxyethylene-polyoxypropylene glycols are hydroxy-terminated copolymers of ethylene oxide and propylene oxide. These mixed glycols range from mobile to very viscous liquids with molecular weights as high as 40,000. Either water-soluble or water-insoluble products can be prepared, although water-soluble products are preferred in the practice of this invention. Mixed polyoxyethylene-polyoxypropylene glycols are sold commercially under the trademark UCON.

The hydrocarbon oils useful for the lower layer of the multiple layer bath when denser than the upper layer or useful for the upper layer when less dense than the lower layer liquid are the so-called heat treating oils which are well known in the art of metal tempering. Such oils are mineral oils which are obtained from coking operations or petroleum refining. The oils are characterized in that they have low volatility, have resistance to high-temperature, have resistance to oxidation, and have a high flash point. More specifically, the mineral oils useful in the practice of this invention should have a boiling range from about 400° to 800°F.; a flash point from above about 300° to over 600°F. and a SUS viscosity within the range of from about 100 to more than 10,000 seconds at 100°F. If the mineral oils used are petroleum derivatives, they may be paraffinic base, aromatic base, i.e., naphthenic or mixed base oils. Present in the mineral oil, of course, can be various additives such as antioxidants, emulsifiers, thermal stabilizers, viscosity modifiers, surfactants and the like. Such mineral oils are well known in the art of metal tempering and are further described in detail in Metalworking Lubricants; Their Selection, Application and Maintenance, by E. L. Bastian, McGraw-Hill, New York 1951 and Lubricants and Cutting Oils for Machine Tools by W. G. Forbes, Wiley, New York 1943.

The liquid quenching media of this invention should be essentially water free in case certain hygroscopic compositions, such as polyalkylene glycols, are used. By essentially water free is meant that the quenching medium contain less than 5 percent by weight water. If greater amounts of water are present, there will be an increased tendency for the glass sheet to fracture during the tempering operations. This problem is particularly serious with thinner glass sheets, i.e., sheets having a thickness of about 0.050 to 0.090 inch. Although no specific theory has been absolutely proven, it is believed that water forms a vapor blanket around the glass sheets when the glass sheet is initially contacted with quenching medium. This vapor blanket is believed to act as an insulating barrier and to inhibit heat flux at the glass-liquid interface, heat being removed principally by radiation through the vapor film. Thus, the glass is initially cooled very slowly and very little potential for temper is developed. Eventually enough heat will be removed by radiation such that the glass has cooled to a temperature near its strain point. This is a temperature at which the glass ceases to behave as a viscous liquid and starts behaving as an elastic solid. At about this temperature, the vapor blanket is no longer stable and the water comes in direct contact with the glass surface and violent boiling ensues. Heat is removed from the surface of the glass as latent heat of vaporization at a very rapid rate. However, since the glass surface is starting to behave as a solid, it cannot withstand this rapid heat flux and as a result the glass shatters.

However, water may be included in the intermediate layer of a three layer bath containing a hydrocarbon oil or a water-insoluble polyalkylene glycol or a water insoluble silicone ester less dense than water as the uppermost layer and a water insoluble phosphate ester denser than water as the lowest layer.

As stated previously, the liquid quenching media of the upper and/or lower levels of the multi-layer quenching bath of the invention can contain various additives, such as viscosity modifiers, suspension and emulsion stabilizers, wetting agents, detergents, antioxidants and thermal stabilizers, that may be included in minor proportions (up to 15 percent) of the main ingredient of the tempering medium, be the latter a silicone fluid, a hydrocarbon, a polyoxyethylene glycol or the like. Examples of such additives include carboxy methyl cellulose, sodium alkyl sulfonate, sodium dioctyl sulforsucinate and tert-butyl catechol. Other examples of characteristic modifying additives include sterically hindered phenols and cresols, aromatic amines, zinc diorganodithiophosphates, sulfurized dipentenes and terpenes, metal dithiocarbamates, phenates, sulfonates, and salicylates, for example.

In utilizing the liquid quenching baths of the present invention, temperature of the bath can vary considerably. Thus, bath temperatures may be ambient (70°F.) or they may be above or below ambient temperatures. Typically the temperatures range between 50°F. to 450°F. It has been found with larger glass pieces that heating the quenching liquids in the range of 200°F. to 450°F. produces considerably less breakage than temperatures below this range. The upper practical limit on the temperature used is usually the flash point of the particular quenching liquid or blend of quenching liquids used. However, when the bilayer quenching bath contains an upper liquid having a higher flash point than the lower liquid, the layer of upper liquid can segregate the lower liquid from direct exposure to the ambient atmosphere and inhibit flashing of the lower liquid even when the bilayer bath is at a temperature of 350°F. to 450°F., which is in the range of flash point for several hydrocarbon oils and polyalkylene glycols used for the lower layer of the quenching bath.

The various liquid quenching compositions recited may be utilized alone or may be blended with one or more liquids to provide the liquid quenching media to be employed.

The glass which is tempered according to the method of this invention is typically a silica-type of flat glass, particularly soda-lime-silica glass, lead-silica glass and borosilica glass. The nature and production of silica glasses is well known in the art, and generally is described in the Encyclopedia of Chemical Technology, by Kirk-Othmer, published by Interscience Encyclopedia Inc., New York, N.Y., volume 7, pages 181–189. The method of the invention has been found to be particularly useful in the tempering of thinner glass sheets, i.e., glass sheets having a thickness of about 0.050 to 0.125 inch. The method of the invention is generally applicable to tempering glass sheets of from 0.050 to 1 inch or more in thickness.

The geometric configuration of the glass treated in accordance with this invention is not particularly critical in that flat-glass sheets and curved-glass sheets, for example, curved-glass windshields may be tempered using the quenching fluids hereinabove described. The instant process may be readily adapted to either a continuous or a semicontinuous operation to produce resultant tempered glass sheets having an abraded resistance to fracture by stress of the order of 10,000 to 40,000 pounds per square inch and a central tensile stress of the order of 5,000 to 20,000 pounds per square inch.

The edges of the glass to which the frit is applied may be treated by grinding to seam them if desired. The edges when so treated are typically ground with a diamond grit wheel and finish ground using a belt grinder. If desired however, the frit can be applied to the new cut edges of glass sheets without any seaming by grinding and glass successfully tempered using a liquid quenching medium.

The following examples are illustrative of the practice of the instant invention in tempering glass sheets.

EXAMPLE 1

A soda-lime glass sheet 16 inches by 42 inches by 0.090 inch was edge seamed using a diamond grit grinding wheel. The edges were then wet belted with a 400 grit belt.

Glass frit composition particles all below 325 mesh in size having the chemical composition listed in Table I and carried in a pine oil vehicle were applied to the edges of the glass sheet after the wet belting. The glass after having all edges coated with the frit composition was heated to a temperature of 1,230°F. Upon attaining this temperature, the glass was shock chilled by dipping it in a multilayer quenching liquid whose upper level was composed of a polysiloxane sold by General Electric under the trademark of SF 97–50 and whose lower level was composed of polyoxyalkylene oxide designated as UCON 50-HB-5100 manufactured by Union Carbide Corporation. The nominal viscosity of the upper layer of liquid was 50 centistokes at 77°F., its density at 60°F. was 8.00 pounds per gallon and its flash point above 535°F. The polyalkylene glycol of the lower layer had a viscosity of 5,100 Saybolt Universal Seconds at 100°F. (about 3,000 centistokes at 77°F.), a density of 8.91 pounds per gallon at 60°F. and a flash point of 440°F. The quenching liquid before immersion was at a temperature of 350°F. The treated glass sheet did not break on immersion and subsequent observation of the cooled glass showed it to be tempered.

Table I

| Frit Composition | Wt.% |
|---|---|
| $SiO_2$ | 18.52 |
| $Al_2O_3$ | 40.08 |
| $Cr_2O_3$ | 4.52 |
| PbO | 35.04 |

EXAMPLES 2–9

The following multi-layer quenching baths suitable for use in dip quenching hot glass sheets to temper glass according to the teachings of the present invention as recited in Example 1 were prepared and stored for approximately 20 months, during which time they were inspected periodically and agitated from time to time. The multiple layer baths retained their discrete layer characteristic in all instances.

EXAMPLE 2

A two layer bath consisted essentially of an upper layer of a methyl polysiloxane liquid sold as General Electric silicone fluid SF-96 having a specific gravity at 25°C. compared to that of water at 25°C. of 0.963, a viscosity of 50 centistokes at 25°C., a flash point greater than 535°F. as determined by the Cleveland open cup method described in American Society for Testing Materials D92–52, a surface tension of 20.8 dynes per centimeter at 25°C., a thermal conductivity of 0.087 BTU per hour per degree Fahrenheit per square foot of area per foot of thickness, a specific heat of 0.36 B.T.U. per pound per degree Fahrenheit, and a maximum volatility of 0.5 percent weight loss at 150°C. for 24 hours poured over a lower layer of a polyalkylene glycol liquid sold as UCON fluid 50-HB-5100 having a specific gravity of 1.063 at 20°C. compared to water at 20°C., a viscosity of 1104 centistokes at 100°F., a flash point of 440°F., an approximate thermal conductivity of 0.118 B.T.U. per hour per degree Fahrenheit per square foot per foot of thickness at 100 degrees Fahrenheit and an approximate specific heat of 0.46 B.T.U. per pound per degree Fahrenheit.

After 20 months of storage broken up by periodic inspection and agitation, the multilayer characteristic remained.

EXAMPLE 3

A three layer bath having upper and lower layers as in the above two layer bath and an intermediate layer of water was also produced and also retained its multilayer characteristic after 20 months of periodic inspection and agitation. The intermediate water layer remained discrete from both the upper and lower liquid layers.

EXAMPLE 4

Another two layer bath that retained its unique two layer characteristic after 20 months of storage during which time it was inspected and agitated periodically contained an upper layer of a mixed base petroleum oil containing about 57 percent by weight of paraffinic carbon, about 32 percent by weight of naphthenic carbon and about 11 percent by weight of aromatic carbon sold under the trademark of Texaco 529 oil having a specific gravity of 0.8816 at 60°F. compared to water at 60°F., a viscosity of 20.5 centistokes at 100 degrees Fahrenheit and a flash point of 365 degrees Fahrenheit (as determined by the Cleveland open cup method described in American Society for Testing and Materials D92–52) superimposed over a lower layer consisting essentially of the same material used in the immediately previous two layer system of Example 2.

EXAMPLE 5

Still another two layer bath that was stored and periodically agitated and inspected and found to retain its bilayer characteristics over a 20 month period contained an upper layer of a petroleum oil and a lower layer of a phosphate ester. The petroleum oil was sold under the trademark of Harmony 53 by the Gulf Oil Corporation and had a specific gravity of 0.8762 at 60 degrees Fahrenheit compared to water at that temperature, a viscosity of 1400 centistokes at 100 degrees Fahrenheit and a flash point as determined by the aforementioned Cleveland open cup method of 450 degrees Fahrenheit. The phosphate ester that comprised the lower layer was purchased as Cellulube 220 from the Celanese Chemical Company and had a specific gravity of approximately 1.145 at 20 degrees Centigrade compared to water at that temperature, a viscosity of 48 centistokes at 100 degrees Fahrenheit and a flash point of 500 degrees Fahrenheit as determined by the Cleveland open cup test.

EXAMPLE 6

Another three layer bath found to retain its multilayer characteristics after 20 months of storage and testing included a lower layer of the Cellulube 220 phosphate ester contained in the last named two layer bath, an upper layer of the Texaco 529 oil and an intermediate layer of the aforesaid General Electric SF-96 methyl polysiloxane.

EXAMPLE 7

Still another three layer bath that retained its multilayer characteristic after 20 months of storage and intermittent agitation and testing contained an upper layer of a polysiloxane, an intermediate layer of water and a lower layer of phosphate ester.

Glass sheets heated to a temperature suitable for tempering and immersed while hot into said multilayer liquids develop stress profiles different from those obtained by immersion in a homogenous liquid bath. By controlling the depth of each liquid layer and the rate and amount of immersion of the glass sheet in the bath, the stress pattern in the direction of glass sheet thickness can be controlled as desired. It is desirable to immerse the glass sheet so that it finally is entirely immersed within the lower layer. If the rate of entry of the glass into the multiple layer bath is rapid and constant and the entire glass sheet is totally submerged in the lowest layer of liquid for a majority of the time it takes the glass to cool to its strain point from the beginning of its immersion, the stress pattern from the glass surface inward in its thickness direction is fairly constant throughout the area of the glass sheet.

EXAMPLE 8

Several glass sheets 12 inches square are individually heated to a temperature of about 1230 degrees Fahrenheit and immersed in a layer of polyalkylene oxide liquid such as recited in Example 1 with the upper level of the liquid at about 400°F. and the lower level of the liquid having a depth greater than the vertical dimension of the sheet at a temperature of about 350°F. After 15 to 30 seconds of immersion, each sheet is removed and an additional sheet treated in a similar manner. Successful temper results in glass sheets so treated.

Such multilevel liquid bath has an intermediate level at a temperature range between that of the upper level and that of the lower level.

EXAMPLE 9

The experiment of Example 8 is performed with a polyalkylene oxide bath using temperatures ranging from 250°F. to 350°F. at the upper level and different temperatures ranging from 200°F. to 300°F. for the lower level. Other variations include using two layers of silicone oils at different temperatures in a liquid quenching bath and hydrocarbon oils arranged in two layers of different temperature in a liquid quenching bath. Glass sheets are successfully tempered in these various baths. Furthermore, one or both of the levels in any of the baths can be modified by adding minor proportions of an additive to modify certain characteristics as recited previously without losing the ability to temper thin glass.

The form of the invention described herein represents a preferred embodiment and several variations thereof. It is understood that various changes may be made without departing from the gist of the invention as defined in the claimed subject matter that follows.

I claim:

1. In a method of tempering glass in which the glass is heated to a temperature above its strain point but below its softening point and is then rapidly chilled by contact with a quenching liquid, the improvement comprising:

a. immersing said heated glass into a multi-layered liquid bath by first immersing a first portion of the heated glass into a first liquid medium having a first heat transfer characteristic at the glass-liquid interface while said liquid medium is at a temperature sufficiently low to cool the glass but insufficiently low to chill-crack the glass, b. then immersing said first portion into a second liquid medium having a greater density and a different heat-transfer characteristic from that of said first liquid medium while immersing a second portion of said glass into said first liquid medium, c. then immersing both portions into said second liquid medium for sufficient time to impart a desired temper in the glass.

2. The improvement according to claim 1, wherein said first liquid medium and said second liquid medium have different compositions and form parts of a multiple layer bath with said first liquid medium arranged as the upper layer of said bath and said second liquid medium arranged as the lower layer of said bath.

3. The improvement according to claim 2, wherein said multiple layer bath consists essentially of said two layers.

4. The improvement according to claim 3, further including an intermediate layer consisting essentially of a mixture or a solution of said two layers.

5. The improvement according to claim 2, wherein said multiple layer bath consists of at least three layers of different liquids.

6. The improvement according to claim 1, wherein said first liquid medium has a lower heat transfer coefficient at the glass-liquid interface than that of the said second liquid medium.

7. The improvement according to claim 6, wherein said upper liquid medium has an average heat transfer coefficient of at least approximately 125 and not more than approximately 350 British Thermal Units per hour, per square foot, per degree Fahrenheit and the lower layer has an average heat transfer coefficient within the range of approximately 200 to 600 British Thermal Units per hour, per square foot, per degree Fahrenheit.

8. The improvement as in claim 1, wherein said first liquid medium has a higher heat transfer coefficient at the glass-liquid interface than that of said second liquid medium.

9. The improvement as in claim 1, wherein said first liquid medium and said second liquid medium are of approximately the same chemical composition and wherein said improvement further comprises maintaining said first liquid medium and said second liquid medium at different temperatures in order to provide said liquid media with different heat transfer characteristics.

10. The improvement as in claim 1, wherein at least one of said liquid media contains a characteristic modifying additive capable of changing at least one of the following characteristics of said medium: raising its flash point, raising its fire point, raising its gel temperature, reducing its tendency to oxidize, changing its degree of polymerization, stabilizing its viscosity and decreasing its volatility.

* * * * *